United States Patent Office 2,911,706
Patented Nov. 10, 1959

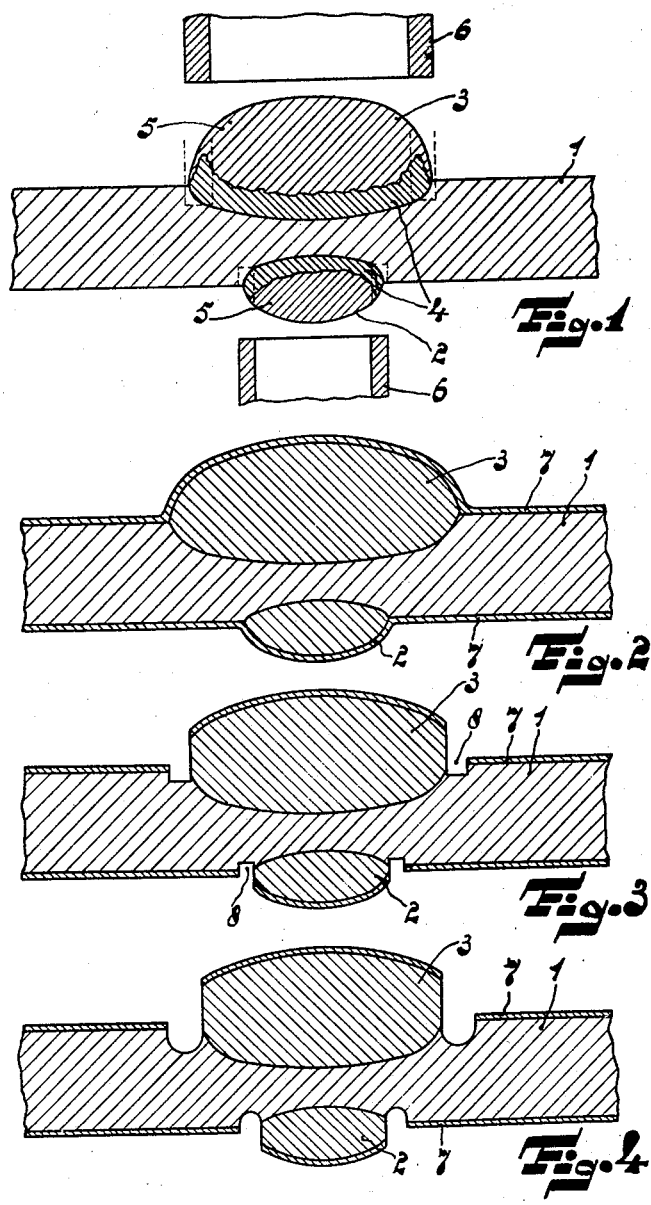

2,911,706

METHOD OF MAKING A SEMI-CONDUCTOR DEVICE

George Wertwijn, Eindhoven, Netherlands, assignor, by mesne assignments, to North American Philips Company, Inc., New York, N.Y., a corporation of Delaware Application December 3, 1954, Serial No. 473,022

Claims priority, application Netherlands December 9, 1953

3 Claims. (Cl. 29—25.3)

This invention relates to methods of manufacturing electrode systems, more particularly a semi-conductor device such as a crystal diode or a transistor comprising a semi-conductive member having at least one fused electrode.

For example, electrode systems are known consisting of a germanium disc contiguous with one or more electrodes in the form of a drop or mass of metal fused to it. If the germanium is of the n-conductivity type the drop may consist of indium.

Thep resent invention has inter alia for its object to improve upon the electrical properties of such systems and to simplify the manufacture.

It is based on the recognition that in such systems the active barrier is presumably formed at the limit of the initial semi-conductive material, for example germanium of n-conductivity type, and a layer substantially consisting of the same material but of different conductivity or of the other conductivity type, for example germanium of p-conductivity type. This layer is produced by crystallisation upon solidification of the electrode fused on to it. It does not cover the whole electrode but only its part contiguous with the semi-conductive member. Furthermore, the invention is based on the realisation that the crystal lattice of the said layer suffers from imperfections notably at its edge, by which the electrical properties are impaired and the break-down voltage is diminished.

The invention permits the configuration of the electrodes to be improved upon, more particularly of transistors with an electrode fused on each side of a semi-conductive member. In this case, the improved configuration has a favourable effect on the frequency characteristic.

In accordance with the invention the edge of at least one fused electrode is cut off, the remaining edge merging into a groove formed in the semi-conductive member and surrounding the electrode. In this context, the expression "cut off" is to be put broadly and comprises any method of removing material, for example drilling, grinding, etching, electron-bombardment and so on.

In one suitable embodiment, the semi-conductive member is provided with a metal layer contiguous with the outer edge of the groove.

The invention furthermore concerns a method of manufacturing such electrode systems which has the feature that, after fusing on an electrode, by mechanical means the edge of the electrode is partly removed and an adjoining groove is formed in the semi-conductive member, further parts of the edge and the wall of the groove subsequently being removed by etching.

In order that the invention may be readily carried into effect it will now be described by way of example with reference to the accompanying drawing in which Figs. 1 to 4 are cross-sectional views illustrating the manner in which the inventive method may be used in the manufacture of alloy transistors.

Fig. 1 shows a transistor comprising a member 1 consisting, for example, of n-type germanium. As a rule this member is of a very small size, for example 2 by 3 by 0.07 mms. Electrodes, that is to say an emitter 2 and a collector 3, are provided one at each side of the said member by fusing on to it indium drops of different sizes.

While the said drops still are in the molten state the fused metal alloys with the semi-conductive material. Upon solidification a thin layer 4 of recrystallized germanium forms. By a judicious choice of the fused-on metal the conductivity and/or conductivity type of the said layer is different from that of the initial semi-conductive material. In the aforesaid embodiment for example, a layer of p-type germanium is found. (This layer can be investigated by stripping it, for example by dissolving the coat of indium 5 in mercury and etching off, in nitric acid, any adhering mercury or amalgam produced.)

It has been found that the electrical properties of this transistor can be improved by cutting off the electrode edges. For this purpose use may, for example, be made of tubular grinding tools diagrammatically indicated by 6. The removed parts are indicated by broken lines. Evidently, defective parts of the crystal structure are removed by the said treatment at the edges of the layer 4, i.e., at the junction of the electrodes 2 and 3 with the member 1.

In many methods of severing the edges, new faults will be introduced at the edge of the barrier. Therefore, the electrode system should finally be etched, which may be effected in a usual bath containing 50% $HNO_3$, specific weight 1.4, and 50% HF (concentration 48% HF in water).

During the etching operation, the surface of the semi-conductive member and of the electrodes will also be attacked. However, the semi-conductive member of decreasing thickness will cause the so-called base-resistance to increase, thus impairing the properties, notably at high frequencies.

This is avoided by preferably masking the surface of the electrode system prior to cutting off the electrode edges, that is to say that the electrode system is provided with a layer which is not attacked by the etching fluid. Such a layer may, for example, consist of polystyrene or paraffin. After the electrode edges have been drilled into through the said mask further material is removed by etching.

Excellent results are obtained if the mask consists of a metal which is not attacked by the etching fluid, since this yields at the same time a low-ohmic base contact.

Several manufacturing phases of such transistors are shown in Figures 2 to 4. After fusing the electrodes 2 and 3 on to a germanium disc 1, the assembly is covered, by electro-deposition, with a gold layer 7 (Fig. 2). Subsequently, the electrode edges are severed mechanically, so that the gold layer is locally removed and a shallow groove 8 may be formed in the member 1 (Fig. 3). Ultimately the transistor is immersed in an etching bath which results in deepening and widening the grooves 8 and in completely removing the more or less imperfect edges of the crystalline layers 4. The parts of the gold layer 7 resting on the semi-conductive member then form at the same time a base contact of very low resistance.

If the mask consists of metal the metal used should not dissolve in the etching bath and furthermore the said metal should form an ohmic contact with the semi-conductive material such as, for example, noble metals and in particular gold and platinum. Alternatively, however, use may be made of a metal acquiring an insoluble surface layer in the etching bath, for example aluminum or lead.

The aforesaid example concerns a transistor made from n-type germanium with indium electrodes, thus obtaining a so-called "n-p-n" transistor. The principle underlying the invention is independent of said choice and the invention may similarly be used with a so-called "p-n-p" transistor obtained, for example, by fusing electrodes consisting of a lead antimony alloy on to a disc of germanium of p-conductivity type.

Neither is the invention limited to the use of germanium as a semi-conductor, since it also applies to other semi-conductors, for example silicon from which transistors and crystal diodes can be made by fusing electrodes on to them.

What is claimed is:

1. A method of manufacturing a semi-conductor device comprising providing a semi-conductive member, fusing an electrode to a portion of a surface of said member, thereby establishing at the junction of the electrode and the semi-conductive member an annular region of crystal imperfections which would impair the properties of the device, thereafter applying to said surface of said member and the surface of said fused electrode a metal layer, thereafter mechanically cutting an annular groove through the metal layer and into the said surface of the semi-conductive member at the area of said junction and of sufficient depth to remove from said member said annular region of crystal imperfections, thereafter applying to said surface of said semi-conductive member an etching solution capable of reacting with the semi-conductive member but not with the metal layer, thereby to etch the area of the thus-formed annular groove.

2. A method of manufacturing a semi-conductor device comprising providing a semi-conductive member, fusing an electrode-forming mass to a portion of a surface of said member, thereby establishing at the junction of the mass and the semi-conductive member an annular region of crystal imperfections which would impair the properties of the device, thereafter electrolytically applying to said surface of said member and the surface of said fused mass a metal layer, thereafter grinding an annular groove through the metal layer and into the said surface of the semi-conductive member at the area of said junction and of sufficient depth to remove from said member said annular region of crystal imperfections, thereafter applying to said surface of said semi-conductive member an etching solution capable of reacting with the semi-conductive member but not with the metal layer, thereby to chemically etch the area of the thus-formed annular groove.

3. A method as set forth in claim 1 wherein the mechanical cutting step removes material from the electrode-forming mass, the metal layer and the semi-conductive member.

References Cited in the file of this patent

UNITED STATES PATENTS

| | | |
|---|---|---|
| 2,629,800 | Pearson | Feb. 24, 1953 |
| 2,644,852 | Dunlap | July 7, 1953 |
| 2,665,399 | Lingel | Jan. 5, 1954 |
| 2,802,159 | Stump | Aug. 6, 1957 |

FOREIGN PATENTS

| | | |
|---|---|---|
| 1,048,471 | France | Aug. 5, 1953 |